(12) United States Patent
Grant et al.

(10) Patent No.: US 9,064,401 B2
(45) Date of Patent: Jun. 23, 2015

(54) LIQUID NATURAL GAS CRYOGENIC TANK LEAK DETECTION SYSTEM

(71) Applicant: Caterpillar Inc., Peoria, IL (US)

(72) Inventors: Steven Thomas Grant, Groveland, IL (US); Frank Lombardi, Metamora, IL (US); Daniel Reese Puckett, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 148 days.

(21) Appl. No.: 13/888,522

(22) Filed: May 7, 2013

(65) Prior Publication Data

US 2014/0333444 A1 Nov. 13, 2014

(51) Int. Cl.
*G08B 21/00* (2006.01)
*G08B 21/18* (2006.01)

(52) U.S. Cl.
CPC ..................... *G08B 21/182* (2013.01)

(58) Field of Classification Search
CPC ...... G08B 21/00; G08B 21/18; G08B 21/182; G01M 3/26; G01M 3/2846; G01M 3/2853; G01F 23/0061; G01F 23/0092
USPC ................... 340/605, 606, 450, 450.2, 539.1; 73/40.5 R, 49.5, 49.7, 149; 429/13, 25; 702/45, 55
See application file for complete search history.

(56) References Cited

U.S. PATENT DOCUMENTS

| | | | | |
|---|---|---|---|---|
| 4,041,771 | A * | 8/1977 | Allan et al. | 73/40.5 R |
| 7,197,409 | B2 * | 3/2007 | Hillam et al. | 702/55 |
| 7,603,242 | B2 | 10/2009 | Tichborne et al. | |
| 7,629,067 | B2 * | 12/2009 | Beliveau et al. | 429/411 |
| 7,648,787 | B2 | 1/2010 | Suematsu et al. | |
| 8,020,430 | B2 * | 9/2011 | Farnsworth | 73/40.5 R |
| 2007/0261477 | A1 | 11/2007 | Koike et al. | |
| 2013/0199616 | A1 * | 8/2013 | Van Tassel | 137/1 |
| 2014/0111327 | A1 * | 4/2014 | Naidu et al. | 340/450 |

FOREIGN PATENT DOCUMENTS

RU 2 240 263 11/2004

* cited by examiner

*Primary Examiner* — Hung T Nguyen
(74) *Attorney, Agent, or Firm* — Finnegan, Henderson, Farabow, Garrett & Dunner, LLP

(57) ABSTRACT

A method of detecting leakage of a fluid from a tank is disclosed. The method may include determining cumulative commanded fluid consumption of the fluid in the tank over a selected time period, determining an actual change of a volume of the fluid in the tank over the selected time period, and comparing the cumulative commanded fluid consumption to the actual change of volume of the fluid. The method may further include producing a leak warning upon the actual change of volume of the fluid over the selected time period exceeding the cumulative commanded fluid consumption over the selected time period plus a threshold value.

20 Claims, 2 Drawing Sheets

LIQUID NATURAL GAS CRYOGENIC TANK LEAK DETECTION SYSTEM

TECHNICAL FIELD

The present disclosure is directed to a leak detection system and, more particularly, to a liquid natural gas cryogenic tank leak detection system.

BACKGROUND

The desire to provide high efficiency power plants with low emissions has resulted in an increased emphasis on the use of fuels that are readily available and that are clean burning. Natural gas is an abundant, clean burning fuel with improved emission levels of both nitrogen oxides and particulate matter. The conversion of diesel engines, which inherently have high efficiency as a result of high compression ratios, into natural gas operation for improved emissions levels has been an aspiration of the internal combustion engine industry for a period of time. A known technique for converting diesel engines to natural gas operation is called dual-fuel operation. A type of dual fuel combustion engine known as a High Pressure Direct Injection (HPDI) gas engine has become known in the art. HPDI gas engines burn a large percentage of gaseous fuel, yielding an improvement (over diesel engines) with respect to the emission levels. In addition, HPDI gas engines purport to achieve the same combustion efficiency, power and torque output as state-of-the-art diesel engines. The operational principle underlying HPDI gas engines is that two fuels are injected under pressure into the combustion chamber near the end of the compression stroke. According to one method, a small quantity of "pilot fuel" (typically diesel) is injected into the cylinder immediately followed by a more substantial quantity of gaseous natural gas. The pilot fuel readily ignites at the pressure and temperature within the cylinder at the end of the compression stroke, and the combustion of the pilot fuel initiates the combustion of the natural gas that might otherwise be difficult to ignite.

When transporting natural gas, the most efficient means is to transport it in a liquid state. Liquefied natural gas ("LNG") takes up only a fraction (about 1/600) of the volume of natural gas in its gaseous state, and may be maintained in its liquid state in cryogenic compartments. LNG is stored in cryogenic compartments either at or slightly above atmospheric pressure. To produce LNG, natural gas is cooled below its boiling point (about −161° C. at ambient pressure). While it is practical to transport LNG because it takes up a fraction of the volume of natural gas in its gaseous state, natural gas is usually required in its gaseous state for combustion. LNG may be converted into its gaseous form by raising the temperature of the LNG. Detection of any leakage of the LNG from cryogenic tanks on mobile machines that use the natural gas to power HPDI engines is important for both safety and fuel efficiency reasons.

One attempt at detecting leaks of fuel gas in a fuel cell system is described in U.S. Pat. No. 7,648,787 (Suematsu et al.), which describes a method where the amount of fuel gas supplied through a fuel gas supply passage and the amount of the fuel gas consumed by a fuel cell are detected. A difference between the amount of supplied fuel gas and the amount of consumed fuel gas is calculated, and then this difference is corrected by subtracting any changes in the amount of fuel gas in any of the fuel gas passages. The method requires calculating any changes in the amount of fuel gas in the fuel gas passages by measuring the pressure of fuel gas in the fuel gas passages and any change in the pressure of the fuel gas in the fuel gas passages. If the corrected difference between the amount of supplied fuel gas and the amount of consumed fuel gas is greater than a threshold value, a leak is detected.

Although the method disclosed by Suematsu et al. may help to detect leaks of fuel gases, the method is complicated and may introduce additional errors in a determination of leaks as a result of having to determine the actual amount of gas consumed, and having to measure changes in pressure of the fuel gases within fuel passages. Additionally, the method is concerned with the leakage of gaseous hydrogen, and therefore may not provide sufficient accuracy for the determination of leakage of LNG from a cryogenic tank.

The disclosed system and method is directed to overcoming one or more of the problems set forth above and/or elsewhere in the prior art.

SUMMARY

In one aspect, the disclosure is directed to a method of detecting leakage of a fluid from a tank. The method may include determining cumulative commanded fluid consumption of the fluid in the tank over a selected time period, and determining an actual change of a volume of the fluid in the tank over the selected time period. The method may further include comparing the cumulative commanded fluid consumption to the actual change of volume of the fluid over the selected time period, and generating a leak warning upon the actual change of volume of the fluid over the selected time period exceeding the cumulative commanded fluid consumption over the selected time period.

In another aspect, the disclosure is directed toward a method of detecting leakage of liquid natural gas (LNG) from a cryogenic tank. The method may include determining commanded LNG consumption from the tank at a selected time, and determining an actual rate of change of a volume of the LNG in the tank at the selected time. The method may further include comparing the commanded LNG consumption at the selected time to the actual rate of change of volume of the LNG at the selected time, and generating a LNG leak warning upon the actual rate of change of volume of the LNG at the selected time exceeding the commanded LNG consumption at the selected time.

In yet another aspect, the disclosure is directed to a system for detecting leakage of liquid natural gas (LNG) from a cryogenic tank. The system may include a first control module configured for determining cumulative commanded LNG consumption from the tank over a selected time period, a second control module configured for determining an actual change of a volume of the LNG in the tank over the selected time period, and a comparator configured for comparing the cumulative commanded LNG consumption to the actual change of volume of the LNG. The system may further include an alarm module configured for generating a LNG leak warning upon the actual change of volume of the LNG over the selected time period exceeding the cumulative commanded LNG consumption over the selected time period.

DETAILED DESCRIPTION

Figure 1:
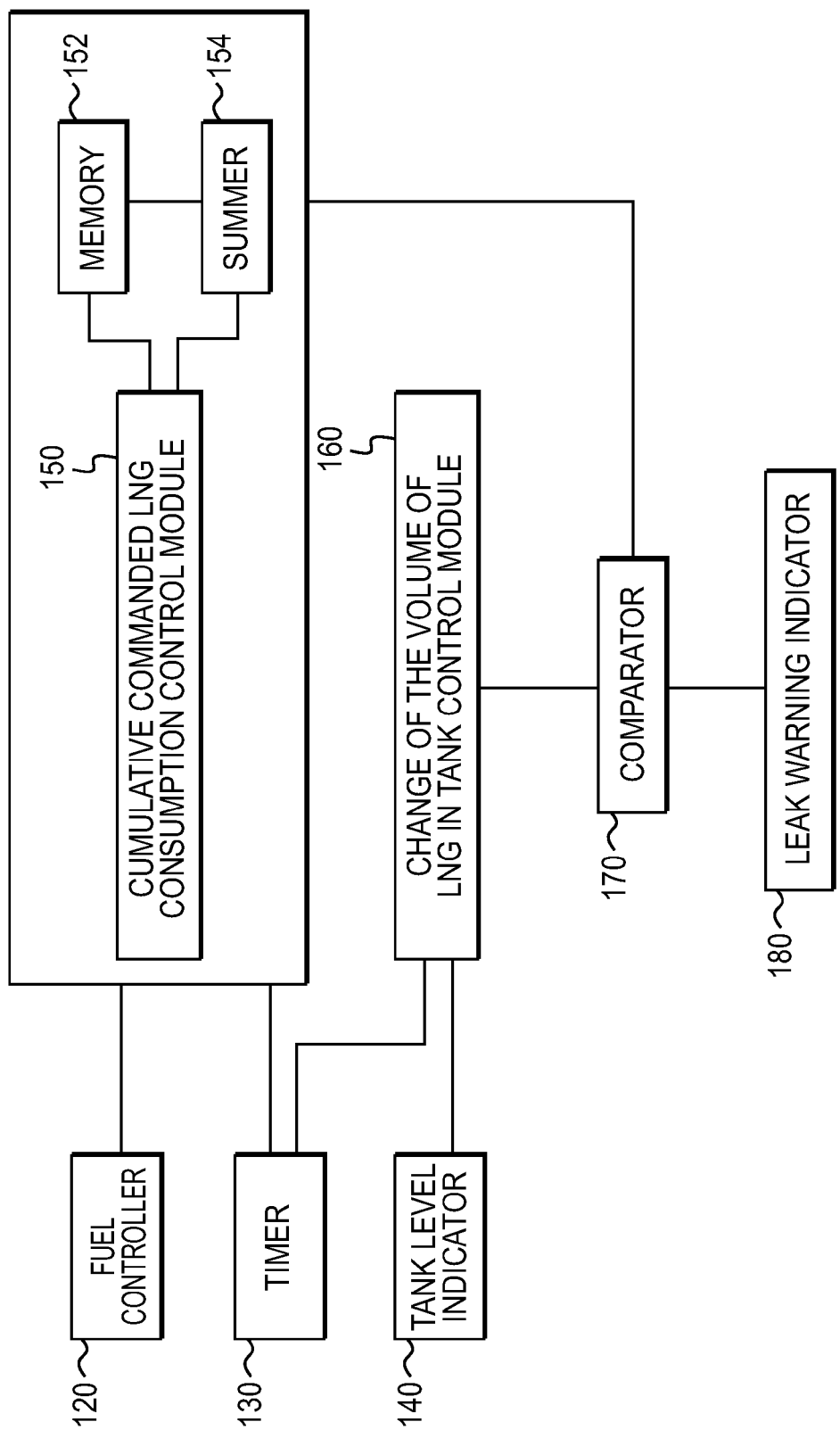
FIG. 1 is a block diagram of an exemplary system for detecting leakage of a fluid from a tank.

FIG. 1 illustrates an exemplary system for detecting leakage of a fluid from a tank. The exemplary system may include one or more control modules, which may be separate from or incorporated into a fuel control system for a LNG HPDI engine on a mobile machine. A method for detecting leakage of a fluid from a tank using the system of FIG. 1 may be independent from any method of detecting gas fumes leaking from the tank. The one or more control modules may be implemented in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A fuel controller 120 may be an existing fuel controller configured to regulate the amount of fuel supplied to the HPDI engine on the mobile machine. Alternatively, fuel controller 120 may be separate from a fuel controller that is actually commanding the amounts of LNG to be provided to a HPDI engine, but configured to receive signals from a fuel controller associated with a HPDI engine and pass those signals on to a first control module 150. First control module 150 may be configured for determining cumulative commanded fluid consumption of the fluid in a tank during a selected time period. First control module 150 may be configured to receive signals from fuel controller 120, with the signals being indicative of commanded rates of fuel consumption. One of ordinary skill in the art will recognize that commanded rates of fuel consumption received from fuel controller 120 may be volume-based or mass-based. If the rates of fuel consumption received from fuel controller 120 are mass-based, first control module 150 may be configured to convert the mass-based values to volume-based values using additional parameters including current temperature, pressure, and specific gravity or density of the fuel. These signals may be digital signals corresponding to specific commanded fuel flow rates determined automatically by fuel controller 120 based on power demands, or determined as a function of inputs received from an operator located on the mobile machine, or from an operator remotely controlling the mobile machine. First control module 150 may be configured to determine the cumulative commanded fluid consumption during a time period by multiplying commanded fuel flow rates during each of successive time intervals in the time period by each associated time interval, and adding together the resulting commanded volumes of fuel for all of the time intervals in the time period. For example, if the time period includes ten (10) one second time intervals, and a commanded fuel flow rate during each of the one second time intervals is 10 cubic inches per second, then the cumulative commanded fluid consumption during the time period is 100 cubic inches. In embodiments where signals received from fuel controller 120 are indicative of commanded fuel flow rates measured in units of mass per time, first control module 150 may be configured to convert these values into volumetric flow rates.

A timer 130 may be provided and configured to measure elapsed time during various selected time periods. Timer 130 may also be configured to provide signals indicative of periodic, time intervals throughout a selected time period. In various implementations of this disclosure the frequency of the time intervals, or the length or period of each time interval within a selected time period may be constant or varied, and may range from multiple intervals per second to multiple seconds or minutes per each time interval.

A tank level indicator 140 may also be provided and configured to output signals indicative of the level of LNG in one or more cryogenic tanks used to store LNG in liquefied form on the mobile machine. Various techniques may be used by tank level indicator 140 to provide signals indicative of the level of LNG in the one or more cryogenic tanks, and recursive filters such as a Kalman filter may also be provided to obtain more accurate measurements of the amount of fuel in each tank. The Kalman filter is an algorithm that uses a series of measurements observed over time, containing noise (random variations) and other inaccuracies, and produces estimates of unknown variables that tend to be more precise than those based on a single measurement alone. The Kalman filter may operate recursively on streams of noisy input data, such as the level of LNG in each cryogenic tank, to produce a statistically optimal estimate of the underlying system state.

A second control module 160 may be configured to receive signals from tank level indicator 140 and process those signals in combination with signals indicative of time or intervals of time received from timer 130. Second control module 160 may be configured to determine a change of the volume of LNG per time interval in the one or more cryogenic tanks based on signals received from tank level indicator 140 and timer 130. A Kalman filter may be included with second control module 160 in order to process signals received from tank level indicator 140 and produce a best estimate of the quantity of LNG in the one or more cryogenic tanks. The Kalman filter may produce estimates of the amount of LNG during a prediction step, along with the uncertainty of each estimate. Once the outcome of a next measurement (necessarily corrupted with some amount of error, including random noise) is observed, these estimates are updated using a weighted average, with more weight being given to estimates with higher certainty. Because of the algorithm's recursive nature, it can run in real time using only the present input measurements from tank level indicator 140, and the most recently calculated state, with no additional past information being required. In various alternative implementations second control module 160 may be configured for receiving a plurality of signals from tank level indicator 140, each signal indicative of a level of the fluid in the tank at periodic, time intervals throughout a selected time period. Second control module 160 may also be configured for calculating a difference between values corresponding to first and second volumes of fluid in the tank at first and second levels of fluid in the tank at the beginning and the end of a time interval, and dividing the difference by the time interval to determine the actual change of the volume of fluid in the tank per time interval. The selected time period may include a plurality of the time intervals. A determination of a rate of change of the volume of fluid in the tank as measured over any portion of the selected time period may include averaging calculated differences in volume of fluid in the tank per each time interval with calculated differences in volume of fluid in the tank per each of a subset of time intervals immediately preceding a most recent time interval to arrive at a moving average of the actual rate of change of volume of fluid in the tank per time interval.

Second control module 160 may also be configured for determining the actual change of the volume of fluid in the tank as measured over a selected time period while discounting or ignoring actual changes of the volume of fluid in the tank resulting from tank venting during low load or idling conditions. A venting occurrence may produce a signal that may then be provided to second control module 160. In alternative implementations, values for the changes in volume of fluid in the tank during venting may be measured by providing a signal to tank level indicator 140 when a venting condition exists, and changes in tank level resulting from the venting may be compensated for before providing information to second control module 160. Second control module 160 may also be configured to calculate a change of volume of fluid in the one or more tanks resulting from tank venting during low load or idling conditions and subtract that change of volume from an actual change of volume of the fluid in the tank over the selected time period before providing the change of volume of the fluid as measured for the selected time period to a comparator 170. Second control module 160 may be further configured to compensate for changes occurring within the tank such as expansion of LNG within the tank caused by heat transfer throughout the tank.

First control module 150 may be configured to include or be associated with a memory 152 for recording a plurality of signals indicative of the commanded fluid consumption at periodic, time intervals throughout a selected time period determined by timer 130. Memory 152 may also record the commanded volumes of fluid that would result from the commanded fluid consumption for all of the time intervals in the time period. For example, if first control module 150 receives a signal indicative of a commanded fluid consumption of 10 cubic inches of LNG per second during a first one second time interval, memory 152 may record a commanded volume of 10 cubic inches of LNG for that first one second time interval. If first control module 150 then receives a signal indicative of a commanded fluid consumption of 20 cubic inches of LNG per second during a second one second time interval, memory 152 may record a commanded volume of 20 cubic inches of LNG for that second one second time interval. A summer 154 may also be provided and configured for summing values for all commanded volumes of fluid consumption as measured over each of the periodic, time intervals. For example, summer 154 may provide a cumulative commanded volume of 30 cubic inches of LNG after the first and second one second time intervals discussed above. Summer 154 may sum all recorded values for commanded fluid consumption from preceding time intervals during the selected time period to calculate the cumulative commanded fluid consumption of the fluid in the tank up to the most current point in time. First control module 150 may be further configured to record the plurality of signals indicative of commanded fluid consumption in memory 152 after receiving the plurality of signals from fuel controller 120. A strong correlation between commanded fluid consumption as indicated by digital signals received from fuel controller 120 under normal operation of the HPDI LNG engine, and changes in the level of LNG in the cryogenic storage tank, may allow first control module 150 to use the values corresponding to commanded fluid consumption as a proxy for actually having to measure amounts of fluid flow through fuel supply lines.

Values corresponding to cumulative commanded fluid consumption of fluid in the one or more tanks over a selected time period, as derived by first control module 150 in conjunction with memory 152 and summer 154 may be provided to comparator 170. The cumulative commanded fluid consumption over the selected time period may be the total volume of fluid that would have been consumed as a direct result of the specific commanded fuel flow rates received from fuel controller 120 over the selected time period. The accuracy of these measurements may be at least partially a function of the frequency at which first control module 150 receives signals indicative of commanded fuel flow rates. When commanded fuel flow rates are varying significantly over time, more frequent signals indicative of these commanded fuel flow rates received at first control module 150 may increase the accuracy of determination of cumulative commanded fuel consumption over a selected time period. This determination also assumes that all commanded fuel flow rates are actually consumed. Comparator 170 may also receive values derived by second control module 160 corresponding to the change of the volume of the fluid in the one or more tanks over the selected time period. Comparator 170 may be configured to compare the values received from first control module 150 and second control module 160. In various implementations comparator 170 may be further configured to compare a difference between values received from first and second control modules 150, 160 with a threshold value in order to avoid receiving too many false leakage indications. The threshold value may be set anywhere from a value of zero, where no difference is allowed between a value for cumulative commanded fluid consumption during a selected time period and a change in volume in the one or more tanks during the selected time period, and any greater value desired to account for inaccuracies in measurement or other margins of error. Comparator 170 may provide the results of the comparison of values received from first control module 150 and second control module 160 to a leak warning indicator 180.

Certain implementations of the present disclosure may advantageously facilitate detection of a persistent low flow-rate fuel leak, for example by means of effectively comparing a first parameter—a measure of the cumulative commanded fluid consumption of fluid in a tank over a selected time period, with a second parameter—a measure of the actual change of a volume of the fluid in the tank over the selected time period. In various implementations, a leak may be deemed present if the effective discrepancy between the first and second parameters is greater than a preset threshold. As discussed above, such a threshold may be necessary in view of inaccuracies in the measurements made. If the rate of fuel loss by means of a fuel leak is relatively low, various implementations of the present disclosure may enable detection of the leak, even though the rate of fuel loss may be small enough to remain undetected if the leakage detection relied solely on comparing the rate of the reduction in fuel in the tank as determined from successive measurements of the amount of fuel in the tank. A comparison of the cumulative commanded fluid consumption of fluid in one or more tanks over a selected time period to the actual change of the volume of fluid in the one or more tanks over the selected time period will enable the detection of even low flow-rate leaks. The frequency over time at which the values for the first and second parameters are determined and compared may also affect the ability to detect low flow-rate leaks.

Additionally or alternatively, certain implementations of the present disclosure may also advantageously facilitate detection of a transitory high flow-rate fuel leak, for example by means of effectively comparing a measure of the commanded LNG consumption at a first given instant (third parameter) with the physical measurement of the rate of change of a volume of the LNG in the cryogenic tank at the first given instant (fourth parameter). As discussed above, the commanded LNG consumption at any instant in time may be directly derived from a specific commanded fuel flow rate received from fuel controller 120 at that instant in time. A leak may be deemed present if the effective discrepancy between the third and fourth parameters is greater than a preset threshold. The threshold used when comparing the third and fourth parameters may be different from the threshold used when comparing the first and second parameters as discussed above. The measures taken only at a given instant in time may not be as statistically reliable as measures taken over successive intervals of time. However, despite the potential unreliability of the measures at any particular instant in time, if a high flow rate leak starts abruptly, the leak may be detected earlier than would otherwise be the case.

Figure 2:
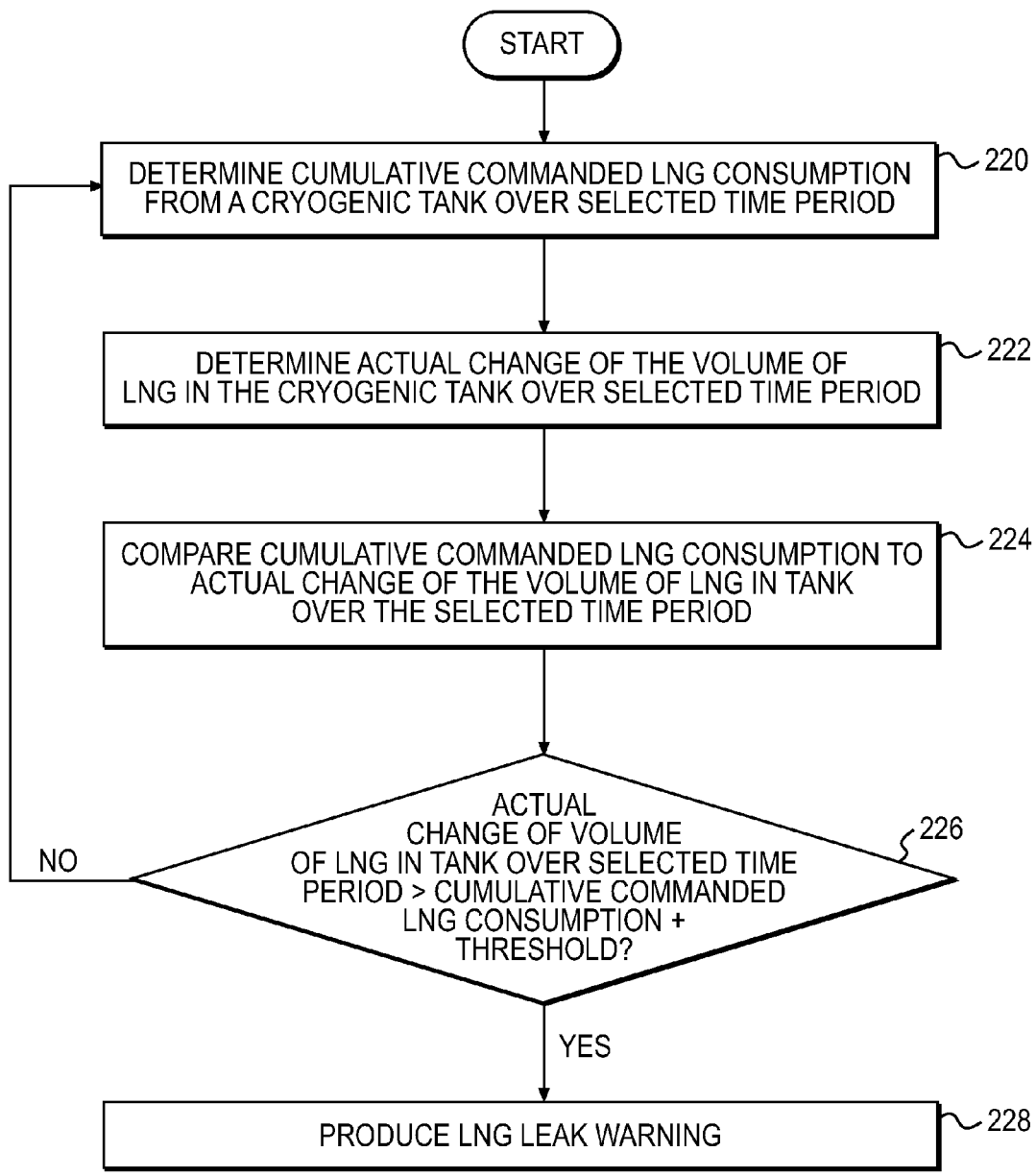
FIG. 2 is a flow chart of an exemplary process that may be performed by the system of FIG. 1.

FIG. 2 illustrates an exemplary disclosed method of detecting leakage of LNG from a cryogenic tank. The method steps may be stored as instructions on a non-transitory computer readable medium for execution by a controller. FIG. 2 will be discussed in more detail in the following section to further illustrate the disclosed concepts.

INDUSTRIAL APPLICABILITY

The disclosed system and method for detecting leakage of LNG from a cryogenic tank carrying the LNG on a mobile machine may provide an effective way of accurately and rapidly determining whether a leak is present. The system and method may determine whether a leak is present while using information already readily available from a fuel control system associated with the engine for the mobile machine. By comparing two independent parameters such as cumulative commanded fluid consumption over a selected time period and actual change of a volume of the fluid in the tank over the same selected time period, the effects of errors in individual measurements such as the level of fluid in the tank at any particular time may be reduced.

Referring to FIG. 2, an exemplary implementation may include determining cumulative commanded LNG consumption from a cryogenic tank over a selected time period at step 220. As discussed above, this determination may be made by a first control module 150 receiving signals indicative of actual fuel commands from a fuel controller 120. Fuel controller 120 may be part of an existing fuel control system for a HPDI LNG engine on a mobile machine.

Step 222 may include determining an actual change of a volume of the LNG in the cryogenic tank over the selected time period. This step may include receiving information on the level of LNG in the tank at successive time intervals during the selected time period from tank level indicator 140. The difference between levels of LNG in the tank at successive time intervals may be associated with changes in volume of the LNG based upon known tank configuration parameters. In various alternative implementations, changes in the length of time intervals over which changes in volume in the tank are measured may be varied. Shorter time intervals may allow for more frequent determinations of changes in volume in the tank, and more data points at which a change in volume in the tank may be compared to cumulative commanded LNG consumption. A second control module 160 may use this information from tank level indicator 140 and timer 130 to determine the actual change of volume of the LNG for a plurality of time intervals throughout the selected time period.

Step 224 may include comparing the cumulative commanded LNG consumption to an actual change of a volume of LNG in the cryogenic tank over the selected time period. At step 226, a determination may be made as to whether the actual change of volume of LNG in the tank over the selected time period is greater than the cumulative commanded LNG consumption for that selected time period plus a threshold value. If the answer is yes, then step 228 may include producing a LNG leak warning. If the actual change of volume of LNG in the tank over the selected time period is not greater than the cumulative commanded LNG consumption plus a threshold, then no leak determination is made, and the process may return to step 220. As discussed above, one of ordinary skill in the art will recognize that the threshold may be set anywhere from a value of zero, where there is no difference between a value for cumulative commanded fluid consumption during a selected time period and a change in volume in the one or more tanks during the selected time period, and any greater value desired to account for inaccuracies in measurement or other margins of error.

It will be apparent to those skilled in the art that various modifications and variations can be made to the system and method of the present disclosure. Other embodiments will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A method of detecting leakage of a fluid from a tank, the method comprising:
   determining cumulative commanded fluid consumption of the fluid in the tank over a selected time period;
   determining an actual change of a volume of the fluid in the tank over the selected time period;
   comparing the cumulative commanded fluid consumption to the actual change of volume of the fluid over the selected time period; and
   generating a leak warning upon the actual change of volume of the fluid over the selected time period exceeding the cumulative commanded fluid consumption over the selected time period plus a threshold value.

2. The method of claim 1, wherein the leakage of the fluid from the tank is leakage of liquid natural gas from a cryogenic tank, and wherein the method is independent from any method of detecting gas fumes leaking from the cryogenic tank.

3. The method of claim 1, wherein determining cumulative commanded fluid consumption of the fluid in the tank over the selected time period includes:
   receiving a plurality of signals indicative of commanded fluid consumption at periodic, time intervals throughout the selected time period;
   determining commanded volume of fluid consumption for each of the periodic, time intervals;
   recording values for commanded volume of fluid consumption for each of the periodic, time intervals; and
   summing values for all commanded volumes of fluid consumption for each of the periodic, time intervals with all recorded values for commanded volumes of fluid consumption from preceding time intervals during the selected time period to calculate the cumulative commanded fluid consumption of the fluid in the tank.

4. The method of claim 3, further including:
   receiving the plurality of signals indicative of commanded fluid consumption from a controller configured to determine current demand for the fluid by at least one of automatic determination from a current power demand, and a manual command received from an operator, and wherein the plurality of signals are digital signals indicative of a desired volume flow rate of the fluid.

5. The method of claim 1, wherein determining the actual change of the volume of fluid in the tank over the selected time period includes discounting actual changes of the volume of fluid in the tank resulting from tank venting during low load conditions.

6. The method of claim 5, wherein a change of volume of fluid in the tank resulting from tank venting during low load conditions is calculated and subtracted from an actual change of volume of the fluid in the tank over the selected time period before comparing the cumulative commanded fluid consumption to the actual change of volume of the fluid over the selected time period.

7. The method of claim 1, wherein determining the actual change of the volume of fluid in the tank over the selected time period includes:
   receiving a plurality of signals, each signal indicative of a level of the fluid in the tank at periodic, time intervals throughout the selected time period; and
   calculating a difference between a value corresponding to a first volume of fluid in the tank at the beginning of a time interval and a value corresponding to a second volume of fluid in the tank at the end of the time interval.

8. The method of claim 7, wherein the selected time period includes a plurality of said periodic, time intervals, and determining the actual change of the volume of fluid in the tank over the selected time period includes averaging calculated differences in volume of fluid in the tank per each time interval with calculated differences in volume of fluid in the tank per each of a subset of time intervals immediately preceding a most recent time interval to arrive at a moving average of the actual change of volume of fluid in the tank per each time interval.

9. The method of claim 1, wherein a leak warning is produced upon the actual change of volume of the fluid in the tank over the selected time period exceeding the cumulative commanded fluid consumption over the selected time period plus a threshold value equal to zero.

10. A method of detecting leakage of liquid natural gas from a cryogenic tank, the method comprising:
   determining commanded liquid natural gas consumption from the tank at a selected time;
   determining an actual rate of change of a volume of the liquid natural gas in the tank at the selected time;
   comparing the commanded liquid natural gas consumption to the actual rate of change of volume of the liquid natural gas; and
   producing a liquid natural gas leak warning upon the actual rate of change of volume of the liquid natural gas at the selected time exceeding the commanded liquid natural gas consumption at the selected time.

11. The method of claim 10, wherein determining commanded liquid natural gas consumption from the tank at a selected time includes receiving a signal from a fuel controller configured to determine current demand for fuel by at least one of automatic determination from a current power demand, and a manual command received from an operator, and wherein the signal is a digital signal indicative of a desired volume flow rate of the liquid natural gas.

12. A system for detecting leakage of a fluid from a tank, the system comprising:
   a first control module configured for determining cumulative commanded fluid consumption of the fluid in the tank over a selected time period;
   a second control module configured for determining an actual change of a volume of the fluid in the tank over the selected time period;
   a comparator configured for comparing the cumulative commanded fluid consumption to the actual change of volume of the fluid; and
   an alarm configured for producing a leak warning upon the actual change of volume of the fluid over the selected time period exceeding the cumulative commanded fluid consumption over the selected time period plus a threshold value.

13. The system of claim 12, wherein the leakage of the fluid from the tank is leakage of liquid natural gas from a cryogenic tank, and wherein the system is independent from any system for detecting gas fumes leaking from the cryogenic tank.

14. The system of claim 12, wherein the first control module configured for determining cumulative commanded fluid consumption of the fluid in the tank over the selected time period includes:
   a memory for recording a plurality of values for commanded volume of fluid consumption for each of periodic, time intervals making up the selected time period, each of the plurality of values for commanded volume of fluid consumption being determined from signals indicative of commanded fluid consumption over each of the periodic, time intervals throughout the selected time period; and
   a summer configured for summing values for all commanded volumes of fluid consumption for each of the periodic, time intervals with all recorded values for commanded volumes of fluid consumption from preceding time intervals during the selected time period to calculate the cumulative commanded fluid consumption of the fluid in the tank.

15. The system of claim 14, wherein the first control module is further configured for receiving the signals indicative of commanded fluid consumption from a power controller configured to determine current demand for the fluid by at least one of automatic determination from a current power demand, and a manual power command received from an operator, and wherein the signals are digital signals indicative of a desired volume flow rate of the fluid.

16. The system of claim 12, wherein the second control module configured for determining the actual change of the volume of fluid in the tank over the selected time period is further configured to discount actual changes of the volume of fluid in the tank resulting from tank venting during low load conditions.

17. The system of claim 16, wherein the second control module is further configured to calculate a change of volume of fluid in the tank resulting from tank venting during low load conditions and subtract that change of volume from an actual change of volume of the fluid in the tank over the selected time period before comparing the cumulative commanded fluid consumption to the actual change of volume of the fluid.

18. The system of claim 12, wherein the second control module configured for determining the actual change of the volume of fluid in the tank over the selected time period is configured for:
   receiving a plurality of signals, each signal indicative of a level of the fluid in the tank at periodic, time intervals throughout the selected time period; and
   calculating a difference between a value corresponding to a first volume of fluid in the tank at the beginning of a time interval and a value corresponding to a second volume of fluid in the tank at the end of the time interval.

19. The system of claim 18, wherein the selected time period includes a plurality of said time intervals, and determining the actual change of the volume of fluid in the tank includes averaging calculated differences in volume of fluid in the tank per each time interval with calculated differences in volume of fluid in the tank per each of a subset of time intervals immediately preceding a most recent time interval to arrive at a moving average of the actual change of volume of fluid in the tank per each time interval.

20. The system of claim 12, wherein the alarm is configured to produce a leak warning upon the actual change of volume of the fluid in the tank over the selected time period exceeding the cumulative commanded fluid consumption over the selected time period by a threshold value equal to zero.

* * * * *